US012409807B2

(12) United States Patent
Flouty et al.

(10) Patent No.: US 12,409,807 B2
(45) Date of Patent: Sep. 9, 2025

(54) SYSTEMS AND METHODS OF USING A MACHINE LEARNING MODEL TO CLASSIFY CATALYTIC CONVERTER THEFT TAMPER EVENTS BASED ON AUDIO DATA

(71) Applicant: Ford Global Technologies, LLC, Dearborn, MI (US)

(72) Inventors: Evangello Flouty, London (GB); Benjamin George Brown, Westland, MI (US); Tarik Alexander Safir, London (GB); Endre Hanak, Colchester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 18/392,748

(22) Filed: Dec. 21, 2023

(65) Prior Publication Data

US 2025/0206258 A1 Jun. 26, 2025

(51) Int. Cl.
*B60R 25/10* (2013.01)
*B60R 25/102* (2013.01)
*B60R 25/32* (2013.01)
*G06N 3/0464* (2023.01)
*G06N 3/049* (2023.01)

(52) U.S. Cl.
CPC ........ *B60R 25/1004* (2013.01); *B60R 25/102* (2013.01); *B60R 25/32* (2013.01); *G06N 3/0464* (2023.01); *G06N 3/049* (2013.01); *B60R 2025/1016* (2013.01)

(58) Field of Classification Search
CPC ... B60R 25/1004; B60R 25/102; B60R 25/32; B60R 2025/1016; G06N 3/0464; G06N 3/049
See application file for complete search history.

(56) References Cited

U.S. PATENT DOCUMENTS 11,214,236 B2 * 1/2022 Safir ..................... G08B 31/00
2020/0247359 A1 * 8/2020 Murray ................. G06N 20/00

* cited by examiner

*Primary Examiner* — Omeed Alizada
(74) *Attorney, Agent, or Firm* — Frank Lollo; Brooks Kushman P.C.

(57) ABSTRACT

Examples provide systems and methods for detecting vehicle tamper events without relying on a clear line-of-sight. Namely, examples leverage an intelligent insight that many types of vehicle tamper events have unique audio signatures. Accordingly, examples detect/classify vehicle tamper events based on these unique audio signatures. Moreover, examples can verify these audio-based classifications by analyzing acceleration-related data (e.g., relative acceleration data for a body of a vehicle, relative jerk data for a body of a vehicle, etc.) to determine suspicious movement of a body of a vehicle during a potential/suspected vehicle tamper event. This acceleration-related verification step can reduce occurrence of false positive audio-based classifications caused by other noise events proximate to the vehicle that have similar audio signatures to vehicle tamper events (e.g., drilling or other noise from a construction site, rain, etc.).

13 Claims, 9 Drawing Sheets

SYSTEMS AND METHODS OF USING A MACHINE LEARNING MODEL TO CLASSIFY CATALYTIC CONVERTER THEFT TAMPER EVENTS BASED ON AUDIO DATA

BACKGROUND

An accelerometer is a device that measures acceleration-related data for a body the accelerometer is mounted to. The acceleration-related data may comprise relative acceleration (i.e., the relative rate of change of velocity) of the body and/or relative jerk (i.e., the relative rate of change of acceleration) of the body.

Machine learning models may refer to algorithm-based computer programs trained to recognize patterns in data, and make predictions or classifications based on such learned pattern recognition.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
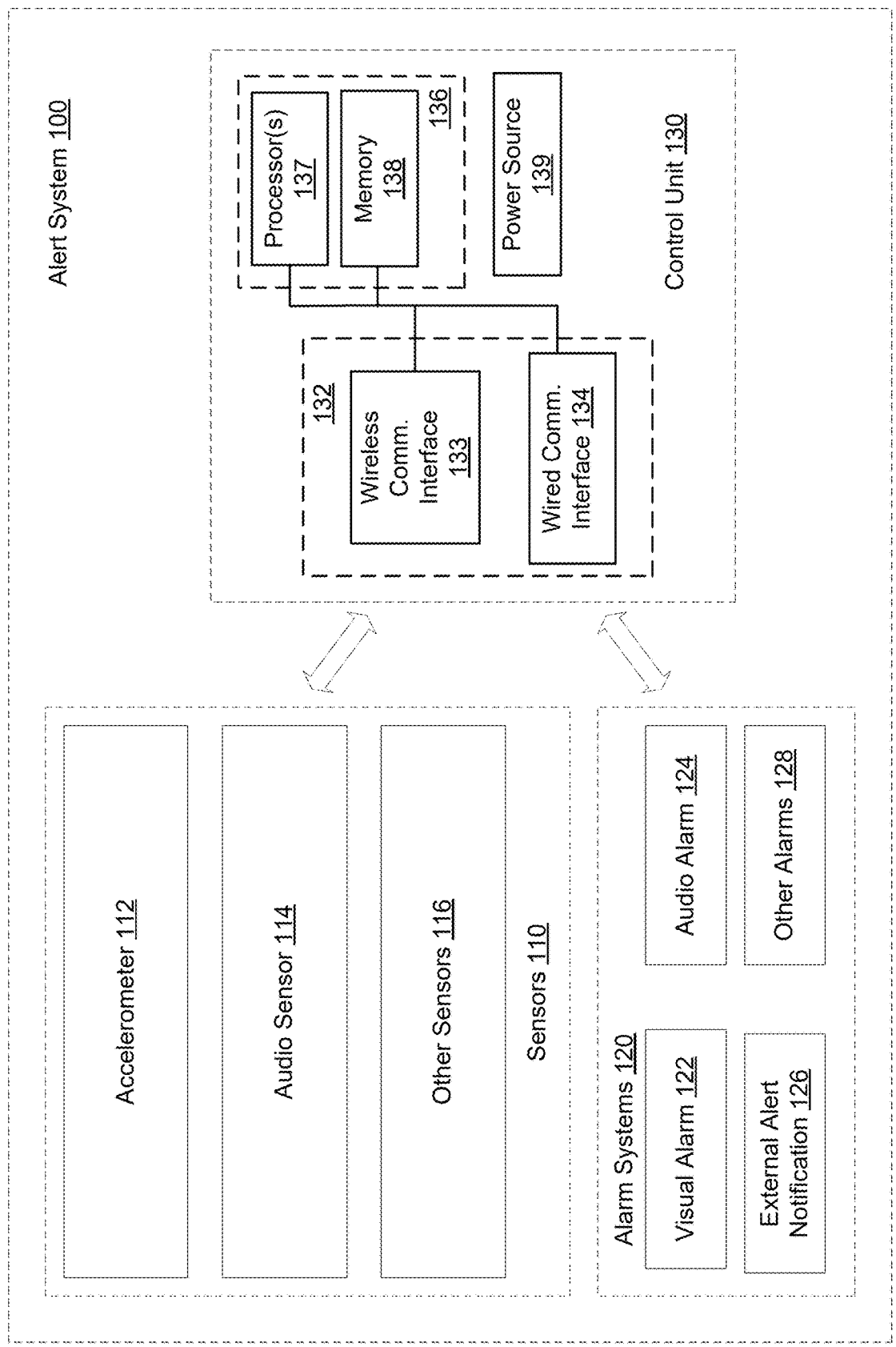
FIG. 1 illustrates an architecture for an example alert system, in accordance with various examples of the presently disclosed technology.

The figures are not exhaustive and do not limit the present disclosure to the precise form disclosed.

DETAILED DESCRIPTION

Thieves and other criminals often target vehicles with the aim of gaining entry and stealing goods from within. Thieves gain access to vehicles using various techniques such as use of hand tools (e.g., drilling), lock picking, keyless hacking, etc. A more recent technique-termed "peel and steal"-involves levering/pulling the top of a door of a vehicle outwards and downwards, or otherwise peeling the bodywork of a vehicle open.

Other types of vehicle tamper events involve thieves stealing valuable vehicle components. For example, catalytic converter theft has emerged as a serious problem. By some accounts, more than 14,400 catalytic converter theft incidents occurred in 2020, representing an increase of more than 1,000% from 2018. As catalytic converters can cost as much as $6,000 to replace per vehicle, such an increase in catalytic converter theft is a major concern for many businesses. This concern is especially acute for businesses that own fleets of vehicles parked in close proximity to each other. Thieves commonly target these fleets to steal catalytic converters from multiple vehicles in a connected theft event. Van fleets are especially vulnerable to this type of theft due to their relatively high vehicle floors-which allow thieves quicker/easier access to catalytic converters typically mounted to the undersides of vehicles.

Various existing technologies have been deployed to detect and deter the above-described vehicle tamper events (as used herein, a vehicle tamper event may refer to an occurrence of unauthorized physical tampering/interference with a vehicle). Examples of these technologies include use of cameras (e.g., dashboard cameras of vehicles), computer vision, proximity sensors (e.g., radar, Lidar, and/or sonar sensors of vehicles), and passive infrared sensors, etc. However, these existing technologies can be ill-suited for detecting/deterring certain types of vehicle tamper events because they often rely on a clear line-of-sight to the thief/vehicle tamper event.

For example, when a thief gains access to the load space of a van, line-of-sight to the thief/vehicle tamper event is often blocked or occluded by the metal walls of the van. Likewise, when a thief is lying beneath the underside of a vehicle to cut/saw away a catalytic converter, line-of-sight to the thief/theft event is often blocked or occluded as well. Accordingly, existing technologies that rely on a clear line-of-sight to detect vehicle tamper events (e.g., cameras, computer vision, proximity sensors, passive infrared sensors, etc.) are often unable to detect these types of vehicle tamper events, or relatedly, are unable to detect these types of vehicle tamper events rapidly enough for optimal deterrence.

Against this backdrop, examples of the presently disclosed technology provide innovative systems and methods for detecting vehicle tamper events without relying on a clear line-of-sight to the vehicle tamper events. Namely, examples leverage an intelligent insight that many types of vehicle tamper events have unique audio signatures. Accordingly, examples detect/classify vehicle tamper events based on these unique audio signatures. In some implementations, examples can train and deploy a machine learning model (sometimes referred to herein as an "audio model") to perform such audio-based classifications. Moreover, examples can verify these audio-based classifications by analyzing acceleration-related data (e.g., relative acceleration data for a body of a vehicle, relative jerk data for a body of a vehicle, etc.) to determine suspicious movement of a body of a vehicle (e.g., a wall or door of the vehicle, a bulkhead of the vehicle, etc.) during a potential/suspected vehicle tamper event. Such acceleration-related data may be acquired by an accelerometer mounted to the body of the vehicle. This acceleration-related verification step can reduce occurrence of false positive audio-based classifications caused by other noise events proximate to the vehicle that have similar audio signatures to vehicle tamper events (e.g., drilling or other noise from a construction site, rain, etc.).

For example, an alert system of the presently disclosed technology may operate to: (1) provide audio data from a potential tamper event involving a vehicle to a machine learning model trained using audio signatures of known vehicle tamper events (e.g., a handle-pull tamper event, a drilling tamper event, a key-lock tamper event, a metal peeling-related tamper event, a catalytic converter theft tamper event, etc.); (2) responsive to the machine learning model classifying the potential tamper event as a vehicle tamper event (based on the audio data), compare acceleration-related data (e.g., relative acceleration data or relative jerk data) from a body of the vehicle (e.g., a wall of the vehicle, a bulkhead of the vehicle, etc.) during the potential tamper event to a threshold (e.g., a threshold acceleration value or a threshold jerk value); (3) (a) responsive to determining the acceleration-related data exceeds the threshold, place the alert system in a heightened state of alert based on the vehicle tamper event classification (e.g., activate an additional sensor of the alert system, activate an audio alert, activate a visual alert, send an alert notification to a location remote from the alert system, etc.); and (3) (b) responsive to determining the acceleration-related data does not exceed the threshold, discard the vehicle tamper event classification and maintain a default state of alert for the alert system. Leveraging audio and vehicle body acceleration-based classifications that do not rely on a clear line-of-sight to a thief/vehicle tampering event, the alert system can detect certain types of vehicle tamper events (e.g., thefts occurring within the load space of a van, catalytic converter thefts occurring beneath the underside of a vehicle, etc.) more rapidly/effectively than existing/alternative technologies. Moreover, leveraging the above-described vehicle body acceleration-related verification step, the alert system can reduce occurrence of false positive classifications caused by other noise events proximate to the vehicle that have similar audio signatures to vehicle tamper events (e.g., drilling or other noise from a construction site, rain, etc.). Reducing occurrence of false positive classifications has many advantages, including: (a) improving consumer trust in the alert system; (b) reducing annoyance of false alarms; (c) saving power in implementations where an additional portion of the alert system is awakened/activated in response to verified detection/classification of a vehicle tamper event; etc.

Another intelligent insight that examples of the presently disclosed technology leverage is that certain vehicle tamper events have unique temporal signatures as well. For example, a handle-pull tamper event (and associated audio from the handle-pull tamper event) typically has a duration of a few seconds or less. By contrast, a catalytic converter theft tamper event (and associated audio from the catalytic converter theft tamper event) typically has a duration of 30 seconds to a minute. Based on this insight, examples of the presently disclosed technology can improve accuracy for audio-based classifications by utilizing a temporal convolutional network (TCN) model specially adapted to learn temporal signatures for vehicle tamper events as well as audio signatures. Relatedly, examples of the presently disclosed technology can convert audio data (e.g., raw audio data or pre-processed audio data) into a temporal format that is more effectively/efficiently processed by the TCN model. For instance, examples can: (1) receive (e.g., from an audio sensor located within an interior space of a vehicle) first audio data (e.g., raw or pre-processed audio data) from a potential vehicle tamper event; (2) encode the first audio data into a latent representation of the first audio data (i.e., a lower-dimension representation of the first audio data that captures important/key features of the first audio data); (3) divide the latent representation into time window frames and stack the time window frames to generate temporal audio data; and (4) provide the temporal audio data to the TCN model for vehicle tamper event classification. Through use of temporal audio data and the TCN model, examples of the presently disclosed technology can improve classification accuracy over alternative approaches lacking this temporal approach. Such an improvement in classification accuracy has similar advantages as described above, including: (a) improving consumer trust; (b) reducing annoyance of false alarms; (c) saving power in implementations where an additional portion of an alert system is activated/awakened in response to verified detection/classification of a vehicle tamper event; (d) allowing for tailored responses to particular types of vehicle tamper events; etc.

Examples of the presently disclosed technology also leverage innovative methods for training a machine learning model (i.e., an audio model) to classify specific types of vehicle tamper events based on audio data. For instance, examples can: (1) receive first audio data from known catalytic converter theft tamper events (such known catalytic converter theft tamper events may comprise "mock"/"simulated" catalytic converter thefts performed on vehicles in a controlled setting, but also actual catalytic converter thefts perpetrated "in-the-wild" that are detected/classified by deployed alert systems of the presently disclosed technology); (2) process the first audio data for improved machine learning model training; and (3) use the processed audio data to train a machine learning model (e.g., a TCN model) to classify potential vehicle tamper events as catalytic converter theft tamper events. Processing the first audio data may comprise various types of processing, including any combination of: (a) sanitizing the first audio data to remove extraneous noise or otherwise discarding noisy data, (b) labelling the first audio data as relating to catalytic converter theft tamper events, (c) encoding the first audio data into latent representations, and (d) preparing temporal audio data by dividing latent representations of the first audio data into time window frames and stacking the time window frames to generate the temporal audio data. Examples can also leverage audio data from known non-catalytic converter theft tamper events (e.g., a handle-pull tamper event, a drilling tamper event, a key-lock tamper event, a metal peeling-related tamper event, etc.) and known non-tamper events (e.g., construction site noise, rain, etc.) to train the machine learning model to classify different types of vehicle tamper events, and distinguish from non-tamper events.

As alluded to above, examples of the presently disclosed technology provide numerous advantages over existing and potential alternative technologies. For instance, leveraging audio and vehicle body acceleration-based classifications that do not rely on a clear line-of-sight to a thief/vehicle tampering event, examples can detect certain types of vehicle tamper events (e.g., thefts occurring within the load space of a van, catalytic converter thefts occurring beneath the underside of a vehicle, etc.) more rapidly/effectively than existing/alternative technologies. Moreover, leveraging the above-described vehicle body acceleration-related verification step, examples can reduce occurrence of false positive classifications caused by other noise events proximate to a vehicle that have similar audio signatures to vehicle tamper events (e.g., drilling or other noise from a construction site, rain, etc.). Reducing occurrence of false positive classifications has many advantages, including: (a) improving consumer trust; (b) reducing annoyance of false alarms; (c) saving power in implementations where an additional portion of an alert system is activated/awakened in response to verified detection/classification of a vehicle tamper event; etc. Relatedly, through use of temporal audio data and TCN models, examples can improve classification accuracy over alternative approaches lacking this temporal approach. Such an improvement in classification accuracy has similar advantages as described above, including: (a) improving consumer trust; (b) reducing annoyance of false alarms; (c) saving power in implementations where an additional portion of an alert system is activated/awakened in response to verified detection/classification of a vehicle tamper event; (d) allowing for tailored responses to particular types of vehicle tamper events; etc.

While the specific examples detailed herein apply to vehicle protection, it should be understood that the principles disclosed herein can be applied to other types of property. For example, certain types of property may occupy (or otherwise be stored in) enclosed spaces where line-of-sight to the property and/or a potential tampering event would be blocked or occluded. Accordingly, an alert system of the presently disclosed technology may operate to: (1) provide audio data from a potential tamper event to a machine learning model trained using audio signatures of known tamper events (e.g., vehicle tamper events or other types of tamper events involving personal property); (2) responsive to the machine learning model classifying the potential tamper event as a tamper event (based on the audio data), compare acceleration-related data (e.g., relative acceleration data or relative jerk data) from a body of property (e.g., a body of property being protected by the alert system) during the potential tamper event to a threshold (e.g., a threshold acceleration value or a threshold jerk value); (3) (a) responsive to determining the acceleration-related data exceeds the threshold, place the alert system in a heightened state of alert based on the tamper event classification (e.g., activate an additional sensor of the alert system, activate an audio alert, activate a visual alert, send an alert notification to a location remote from the alert system, etc.); and (3)(b) responsive to determining the acceleration-related data does not exceed the threshold, discard the tamper event classification and maintain a default state of alert for the alert system Examples of the presently disclosed technology are described in more detail in conjunction with the following FIGs.

FIG. 1 illustrates an architecture for an example alert system 100, in accordance with various examples of the presently disclosed technology.

As depicted, alert system 100 comprises sensors 110, alarm systems 120, and a control unit 130. Sensors 110 and alarm systems 120 can communicate with control unit 130 via a communication circuit 132 (described in greater detail below). While sensors 110 and alarm systems 120 are depicted as communicating with control unit 130, they can also communicate with each other and the outside world via wireless or wired communication. While depicted as a single control unit, control unit 130 can be implemented via multiple control units, or as part of a control unit.

Sensors 110 can include various types of sensors for detecting objects (e.g., potential thieves/criminals, tools wielded by potential thieves/criminals, etc.) in the environment of a vehicle. For example, sensors 110 may include an accelerometer 112 (in various examples multiple accelerometers may be included in sensors 110), an audio sensor 114 (in various examples multiple audio sensors may be included in sensors 110), and other sensors 116. Sensors 110 may comprise any combination of data-gathering-only sensors that provide only raw data to control unit 130 and processing sensors that process raw data (e.g., raw audio data, raw acceleration data, raw jerk data, etc.) and provide processed data (e.g., processed audio data, processed acceleration data, processed jerk data, etc.) to control unit 130. Some of these sensors may provide a combination of raw data and processed data to control unit 130.

As alluded to above, accelerometer 112 may comprise a device which measures acceleration-related data for a body the accelerometer is mounted to. The acceleration-related data may comprise relative acceleration (i.e., the relative rate of change of velocity) and/or relative jerk (i.e., the relative rate of change of acceleration) of the body. For example, if accelerometer 112 is mounted to a bulkhead of a van, accelerometer 112 can measure relative acceleration and/or relative jerk of the bulkhead as the bulkhead is moved/interfered with, such as during a vehicle tamper event. Relatedly, if accelerometer 112 is mounted to a door or wall of a vehicle, accelerometer 112 can measure relative acceleration and/or relative jerk of the door/wall as the door/wall is moved/interfered with, such as during a vehicle tampering event. As examples of the presently disclosed technology are designed in appreciation of, certain bodies of a vehicle may move/vibrate with a similar resonance to other bodies of the vehicle being directly interfered with during a vehicle tampering event. For example, the floor or a wall of a vehicle may move/vibrate with a similar resonance to the exhaust system mounted to the underside of the vehicle. Accordingly, even if accelerometer 112 is mounted to the floor or a wall of a vehicle, it may effectively detect acceleration-related data (i.e., relative acceleration or relative jerk) associated with a thief cutting/sawing a catalytic converter from the underside of the vehicle.

Audio sensor 114 may comprise various types of audio sensors, including a microphone. In various examples, audio sensor 114 may be located/mounted within an interior space of a vehicle (e.g., a load space of the van). In certain examples, audio sensor 114 may be strategically located/oriented such that it can detect sound waves with reduced muffling.

As alluded to above, examples of the presently disclosed technology leverage accelerometers and audio sensors because they can detect vehicle tampering events without relying on a direct/clear line-of-sight to the vehicle tamper events. By contrast, other types of sensors utilized by many existing alert systems rely on a clear line-of-sight in order to detect vehicle tamper events. Examples of these "line-of-sight-reliant" sensors include cameras (e.g., dashboard cameras of vehicles), computer vision, proximity sensors (e.g., radar, Lidar, and/or sonar sensors of vehicles), passive infrared sensors, etc.

Above notwithstanding, other sensors 116 may include the above-referenced "line-of-sight-reliant" sensors, in addition to other types of sensors. Such sensors may still be useful for detecting certain vehicle tamper events where a clear/direct line-of-sight to the vehicle tamper events (or aftermath of the vehicle tamper events) is available. For instance, other sensors 116 may include vibration sensors, motion sensors, temperature sensors, door lock sensors, tilt sensors, wireless signal detectors, GPS devices, cameras having hardware and software to perform facial or object recognition, Lidar, Radar, ANPR, radio frequency detectors, Bluetooth detectors, gyroscopes, passive infrared (PIR), detectors to determine the identity of a mobile device (i.e. mobile phone), or any combination thereof.

In certain examples, sensors 110 can be packaged in a sensing unit of alert system 100. Such a sensing unit can be mounted to, or mounted within a vehicle being protected (e.g., within a load space or other interior space of the vehicle). However, in other examples sensors 110 can be packaged/mounted independently of each other. In various examples, one or more of sensors 110 can be sensors of a vehicle/vehicle system being protected. However, in other examples sensors 110 may be implemented independently from a vehicle/vehicle systems.

As alluded to above, in certain examples accelerometer 112 and audio sensor 114 may run continuously, or at least continuously when a vehicle is unattended. By contrast, some of other sensors 116 (e.g., a camera, radar, Lidar, etc.) may only be activated after a vehicle tamper event is classified and verified. Activating these other sensors may assist with detecting and/or identifying a thief/suspect. Relatedly, by only activating these sensors in response to classifying and verifying a vehicle tamper event, alert system 100 can conserve power/reduce power consumption.

Referring now to control unit 130, control unit 130 can receive any combination of raw and processed data from sensors 110. Based on the received data, control unit 130 can classify and verify vehicle tamper events, and place alert system 100 in a heightened state of alert. For example, control unit 130 can: (1) provide audio data received from audio sensor 114 to a machine learning model trained using audio signatures of known tamper events; (2) responsive to the machine learning model classifying a potential vehicle tamper event that produced the audio data as a vehicle tamper event (based on the audio data), compare acceleration-related data received from accelerometer 112 during the potential vehicle tamper event to a threshold; and (3) responsive to determining the acceleration-related data exceeds the threshold, place alert system 100 in a heightened state of alert based on the vehicle tamper event classification. As alluded to above, placing alert system 100 in a heightened state of alert may comprise any combination of: (a) sending instructions to activate one or more alarm systems of alarm systems 120; and (b) sending instructions to activate one or more sensors of other sensors 116 (e.g., a camera). As alluded to above, in various examples control unit 130 can process data received from sensors 110 into a temporal format better suited for machine learning model use. For example control unit 130 can: (1) receive first audio data (e.g., raw or pre-processed audio data) from audio sensor 114; (2) encode the first audio data into a latent representation; and (3) divide the latent representation into time window frames and stack the time window frames to generate temporal audio data. However, in other examples sensors 110 (e.g., audio sensor 114) may perform the above-described data encoding and latent representation time dividing/stacking.

As depicted, control unit 130 may comprise a communication circuit 132, a determination circuit 136, and a power source 139. Components within control unit 130 can communicate via a data bus, and/or other suitable communication interfaces.

Communication circuit 132 may comprise at least one of a wireless communication interface 133 (e.g., a transceiver with an antenna) and a wired communication interface 134 (e.g., an I/O interface with an associated hardwired data port). Control unit 130 can utilize communication circuit 132 to communicate with sensors 110 and alarm systems 120. Control unit 130 can also utilize communication circuit 132 to communicate with devices remote from alert system 100 (e.g., vehicles, external alert/surveillance systems, connected authorities, etc.).

Wireless communication interface 133 may include a transceiver (i.e., a receiver and transmitter) to allow wireless communications via various communication protocols such as, WiFi, Zigbee, Bluetooth, near field communications, etc. As alluded to above, wireless communication interface 133 may comprise an antenna coupled to the transceiver to send and receive radio signals wirelessly. These radio signals can include information sent to and from sensors 110 and alarm systems 120. These radio signals can also include radio signals sent to and from devices remote from alert system 100 (e.g., vehicles, external alert/surveillance systems, connected authorities, etc.).

Wired communication interface 134 can include a receiver and a transmitter for hardwired communications with other components of alert system 100 (e.g., sensors 110 and alarm systems 120). For example, wired communication interface 134 can provide a hardwired interface to other components, including sensors 110 and alarm systems 120. Wired communication interface 134 can communicate with these components using Ethernet or any number of other wired communication protocols. In various examples, wired communication interface 134 can communicate with devices remote from alert system 100 as well (e.g., a vehicle within, or onto, which alert system 100 is located/mounted).

As depicted, determination circuit 136 includes processor(s) 137 and memory 138. Processor(s) 137 can include one or more processing resources, such as GPUs, CPUs, microprocessors, etc.

Memory 138 may comprise one or more modules of various forms of memory/data storage (e.g., flash, RAM, etc.) for storing the various data, parameters, and operational instructions utilized by processor(s) 137, as well as any other suitable information. For example, memory 138 can store audio and/or temporal signatures of known vehicle tamper events, acceleration-related thresholds or signatures for verifying vehicle tamper event classifications, etc.

While the specific example of FIG. 1 is illustrated using processor and memory circuitry, determination circuit 136 can be implemented utilizing any form of circuitry including, for example, hardware, software, or a combination thereof. As a further example, one or more processors, controllers, ASICs, PLAs, PALs, CPLDs, FPGAS, logical components, software routines or other mechanisms may be used to implement control unit 130.

Power source 139 may comprise any type of suitable power source. For instance, power supply 139 can include one or more batteries (e.g., rechargeable or primary batteries comprising Li-ion, Li-Polymer, NiMH, NiCd, NiZn, $NiH_2$, etc.), a power connector (e.g., to connect to vehicle supplied power), and an energy harvester (e.g., solar cells, piezoelectric system, etc.).

Referring now to alarm systems 120, as depicted alarm systems 120 can include various types of alarm systems including a visual alarm 122 (e.g., flashing lights), an audio alarm 124 (e.g., a horn, a siren, or other an auditory warning signal), an external alarm notification system 126, and other alarms 128. As the name suggests, external alert notification system 126 can send alert notifications to remote entities (e.g., connected authorities, vehicles, etc.) using wireless or wired communication in the same/similar manner as described in conjunction with communication circuit 132 of control unit 130. In some examples, one or more of alarm systems 120 may be connected to, or otherwise associated with, a vehicle/vehicle systems. For example, audio alarm 124 may be connected to a vehicle horn, or visual alarm may be connected to lights of a vehicle. However, in other implementations alarm systems 120 may be implemented independently from a vehicle. While not depicted, alarm systems 120 may include their own processing resources and memory. The same may be true of sensors 110.

As alluded to above, control unit 130 can place alert system 100 in a heightened state of alert by sending instructions to, or otherwise activating one or more of alarm systems 120.

Figure 2:
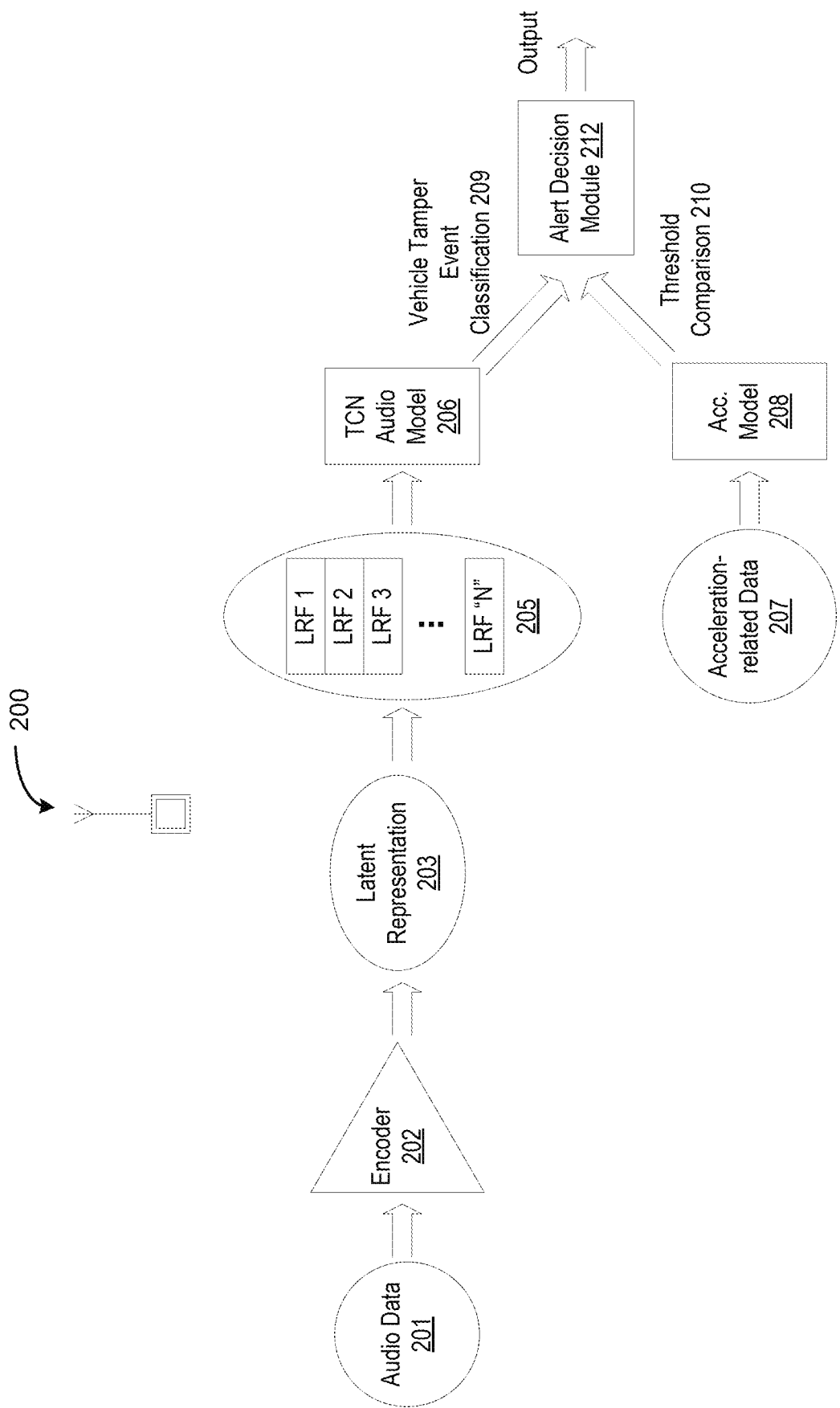
FIG. 2 depicts an example methodology for vehicle tamper event classification and verification, in accordance with various examples of the presently disclosed technology.

FIG. 2 depicts an example methodology for vehicle tamper event classification and verification, in accordance with various examples of the presently disclosed technology. As depicted, the methodology may be performed by an alert system 200 of the presently disclosed technology. Alert system 200 may be the same/similar as alert system 100 described in conjunction with FIG. 1

Before describing FIG. 2 in more detail, it is helpful to reiterate an intelligent insight that examples of the presently disclosed technology are designed in appreciation of. Namely, certain vehicle tamper events have unique temporal signatures as well as unique audio signatures. For example, a handle-pull tamper event (and associated audio from the handle-pull tamper event) typically has a duration of a few seconds or less. By contrast, a catalytic converter theft tamper event (and associated audio from the catalytic converter tamper event) typically has a duration of 30 seconds to a minute. Based on this insight, examples of the presently disclosed technology can improve accuracy for audio-based classifications by utilizing a temporal convolutional network (TCN) model (e.g., TCN audio model 206 of FIG. 2) specially adapted to learn temporal signatures for vehicle tamper events as well as audio signatures. Relatedly, examples of the presently disclosed technology can convert audio data (e.g., raw or pre-processed audio data) into a temporal format that is more effectively/efficiently processed by the TCN model.

As depicted, alert system 200 can use an encoder 202 to encode audio data 201 (e.g., raw audio data or pre-processed audio data) into a latent representation 203. Alert system 200 can then divide latent representation 203 into time window frames, and stack the time window frames to generate temporal audio data 205. Alert system 200 can then provide temporal audio data 205 to a TCN audio model 206 to classify a potential/suspected vehicle tamper event that produced the audio data 201 (or more precisely, the noise event from which audio data 201 was derived). As alluded to above, TCN audio model 206 may be trained to classify potential/suspected vehicle tamper events using audio/temporal audio signatures of known vehicle tamper events.

As alluded to above, audio data 201 may be acquired by an audio sensor of alert system 200 during the potential/suspected vehicle tamper event. Audio data 201 may comprise raw audio data or pre-processed audio data (e.g., sanitized audio data that removes noise, labelled audio data, etc.). In many cases, audio data 201 will capture features/information from audio signals that are not detectable by the human ear.

Latent representation 203 may comprise a lower-dimensional representation of audio data 201 that captures key/important features of audio data 201. As alluded to above, alert system 200 can divide latent representation 203 into time window frames and stack the time window frames to generate temporal audio data.

An example for latent representation 203 may include a root mean square comprising, for each time window frame, a sum of square values of all samples in the time window frame divided by the number of samples in the respective time window frame. Another example for latent representation 203 may comprise an amplitude envelope comprising, for each time window frame, a maximum value in the time window frame. Latent representation 203 could also comprise a zero crossing rate which represents a rate at which an audio signal (captured by audio data 201) crosses the horizontal amplitude axis.

In still further examples, latent representation 203 may comprise a spectrogram and/or one or more types of values/features derived from spectrograms. As used herein, a spectrogram may refer to a visual representation of the spectrum of frequencies of a signal as the signal varies with time. Accordingly, a spectrogram of audio data 201 may comprise a visual representation of the spectrum of frequencies of an audio signal captured within audio data 201. Through rapid generation and analysis of spectrograms (or other types of latent representations), alert system 200 can make vehicle tamper event classifications based on audio signal information that is often not detectable by the human ear. Moreover, leveraging TCN audio model 206, alert system 200 can analyze spectrograms (or other types of latent representations) rapidly to make vehicle tamper event classifications in real-time (or close to real-time). This rapid analysis can be crucial for detecting vehicle tamper events in sufficient time to take effective deterrence measures.

Examples of spectrogram values for latent representation 203 can include: (a) spectral flux (e.g., the Euclidean distance of consecutive normalized spectra); (b) spectral centroid (e.g., where each frame of a magnitude spectrogram is normalized and treated as a distribution over frequency bins, from which the mean (centroid) is extracted per frame); (c) spectral spread (e.g., the second central moment of the spectrum/deviation of the spectrum from the spectral centroid); and (d) spectral roll-off (e.g., the frequency of each frame where a percentage of the total spectral energy is below a roll-off threshold). Another example could be spectral contrast where each frame of a magnitude spectrogram is divided into sub-bands. For each sub-band, the energy contrast is estimated by comparing the mean energy in the top quantile (peak energy) to that of the bottom quantile (valley energy). High contrast values generally correspond to clear, narrow-band signals, while low contrast values correspond to broad-band noise.

Referring again to FIG. 2, as depicted alert system 200 can provide a vehicle tamper event classification 209 from TCN audio model 206 to an alert decision module 212. Output of alert decision module 212 is based on vehicle tamper event classification 209 and a threshold comparison 210 made by an acceleration-related model 208.

As alluded to above, alert system 200 can verify audio-based classifications by analyzing acceleration-related data (e.g., relative acceleration data, relative jerk data, etc.) from a body of the vehicle to determine suspicious movement of the body of a vehicle during the potential/suspected vehicle tamper event. Such acceleration-related data may be acquired by an accelerometer mounted to the body of the vehicle. This acceleration-related verification step can reduce occurrence of false positive audio-based classifications caused by other noise events proximate to the vehicle that have similar audio signatures to vehicle tamper events (e.g., drilling or other noise from a construction site, rain, etc.).

Accordingly, alert system 200 can provide acceleration-related data 207 to acceleration-related model 208. As alluded to above, acceleration-related data 207 may comprise (raw or pre-processed) acceleration data and/or (raw or pre-processed) jerk data from a body of a vehicle during a potential/suspected vehicle tamper event. As alluded to above, acceleration-related data 207 may be acquired by an accelerometer mounted to the body of the vehicle.

Acceleration-related model 208 may comprise a machine learning model trained to analyze acceleration-related data, or another process/algorithm/module capable of comparing acceleration-related data to a corresponding threshold. Accordingly, acceleration-related model 208 can compare acceleration-related data 207 to a corresponding threshold, and provide the threshold comparison 210 to alert decision module 212.

Accordingly, responsive to threshold comparison 210 indicating the threshold was exceeded, alert decision module 212 can place alert system 200 in a heightened state of alert based on vehicle tamper event classification 206. By contrast, responsive to threshold comparison 210 indicating the threshold was not exceeded, alert decision module 212 can discard vehicle tamper event classification 209 and maintain a default state of alert for alert system 200.

Summarizing and restating the description above in a slightly different manner, encoding audio data 201 into latent representation 203 is a process where audio data 201 is transformed into a compact and informative form (i.e., latent representation 203 and then temporal audio data 205) that can be effectively used by machine learning models, such as TCN audio model 206.

As alluded to above, a first step in transforming audio data 201 into latent representation 203 is to extract features from audio data 201 that capture relevant information for a recognition task. Encoder 202 (or a separate feature extraction module or separate convolutional layer(s) dedicated to feature extraction) may perform such feature extraction. Examples of extracted features can include spectrograms, Mel-frequency cepstral coefficients (MFCCs), and chroma features.

As alluded to above, a spectrogram visually represents how spectral density of a signal varies with time, effectively capturing the frequency content over time.

MFCCs are coefficients that collectively make up an MEL-scale cepstral representation of an audio clip. They are derived from the Fourier transform of a signal but are represented on the Mel scale, which approximates the human ear's response to different frequencies.

The above-referenced extracted features might still be high-dimensional, which can be challenging for a machine learning model (e.g., TCN audio model 206) to process efficiently. Accordingly, examples can utilize autoencoders (e.g., encoder 202) to reduce dimensionality. A goal can be to retain the most informative aspects of audio data 201 while reducing the overall size of the data that will be provided to TCN audio model 206.

As alluded to above, encoder 202 can be used to map a high-dimensional feature space into a lower-dimensional latent space 203. Encoder 202 can be trained to produce a latent representation that retains as much of the relevant information from the original audio data 201 as possible. This process can involve the minimization of a loss function that measures the difference between original audio data 201 and reconstructed data (i.e., latent representation 203), ensuring that latent representation 203 is meaningful.

As alluded to above, alert system 200 can then divide latent representation 203 into time window frames, and stack the time window frames to generate temporal audio data 205. Alert system 200 can provide temporal audio data 205 to TCN audio model 206 to classify a potential/suspected vehicle tamper event that produced the audio data 201 (or more precisely, the noise event from which audio data 201 was derived).

In certain implementations, each convolutional layer of TCN audio model 206 can be thought of as a feature transformer, further refining temporal audio data 205 at each layer. TCN audio model 206 can learn to recognize patterns across both the features and the temporal sequence.

In some implementations, the entire process depicted in FIG. 2 can be learned end-to-end. This means that the above-described feature extraction, latent representation learning, and classification are all parts of a single model that is trained together. In some examples, the single model can be designed to include an encoder (e.g., encoder 202) as its initial layer, which automatically learns to convert audio data 201 into latent representation 203 as part of its training process.

Figure 3:
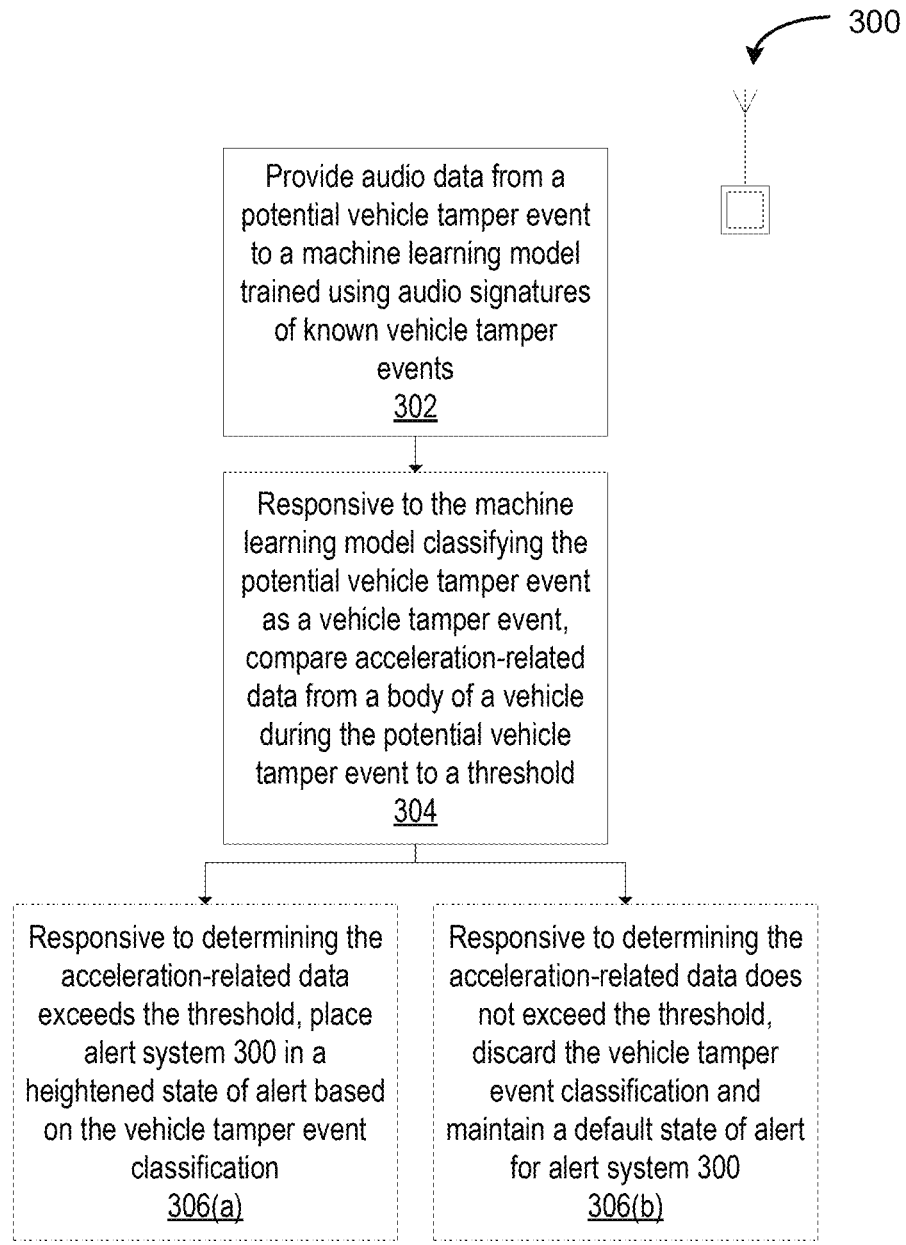
FIG. 3 depicts example operations for performing vehicle tamper event classification and verification, in accordance with various examples of the presently disclosed technology.

FIG. 3 depicts example operations for performing vehicle tamper event classification and verification, in accordance with various examples of the presently disclosed technology. As depicted, the operations of FIG. 3 may be performed by an alert system 300 of the presently disclosed technology. Alert system 300 may be the same/similar as alert system 100 described in conjunction with FIG. 1.

As depicted, alert system 300 can perform operation 302 to provide audio data from a potential vehicle tamper event to a machine learning model trained using audio signatures of known vehicle tamper events. The machine learning model can then classify the potential vehicle tamper event as a vehicle tamper event based on the audio data. The vehicle tamper event classification may comprise any number of vehicle tamper event classifications including: (a) a handle-pull tamper event classification; (b) a drilling tamper event classification; (c) a key-lock tamper event classification; (d) a metal peeling-related tamper event classification (i.e., a vehicle tamper event classification related to tearing or peeling of metal bodywork of a vehicle); and (e) a catalytic converter theft tamper event classification.

In certain implementations the audio data may comprise temporal audio data (e.g., audio data comprising stacked time window frames). Relatedly, the machine learning model may comprise a temporal convolutional network (TCN) model. In these examples, alert system 300 may perform further operations to: (a) receive first audio data from the potential vehicle tamper event; (b) encode the first audio data into a latent representation (i.e., a lower-dimension representation of the first audio data that captures important/key features of the first audio data); (c) divide the latent representation into time window frames and stack the time window frames to generate the temporal audio data; and (d) provide the temporal audio data to the TCN model. The first audio data can comprise raw audio data or pre-processed audio data, and may be received from an audio sensor of alert system 300. The audio sensor may be located within an interior space of a vehicle being protected by alert system 300.

Responsive to the machine learning model classifying the potential vehicle tamper event as a vehicle tamper event (i.e., based on the audio data), alert system 300 can perform operation 304 to compare acceleration-related data from a body of a vehicle (e.g., a body of a vehicle being protected by alert system 300) during the potential vehicle tamper event to a threshold. As alluded to above, the acceleration-related data may comprise at least one of relative acceleration data from the body of the vehicle and relative jerk data from the body of the vehicle. Correspondingly, the threshold may comprise at least one of an acceleration threshold and a jerk threshold. The acceleration-related data may comprise raw or pre-processed data, and may be received from an accelerometer of alert system 300 mounted to a surface of the body of the vehicle.

Responsive to determining the acceleration-related data exceeds the threshold, alert system 300 can perform operation 306(*a*) to place alert system 300 in a heightened state of alert based on the vehicle tamper event classification. Placing alert system 300 in the heightened state of alert may comprise at least one of: (a) activating an additional sensor of alert system 300 (e.g., a camera of alert system 300); (b) activating an audio alert; (c) activating a visual alert; and (c) sending an alert notification to a location remote from alert system 300 (e.g., sending an alert to a separate surveillance system, sending an alert to connected authorities, etc.). As alluded to above, what constitutes placing alert system 300 may be different based on the vehicle tamper event classification. For example, alert system 300 may be placed in a first heightened state of alert in response to a handle-pull tamper event classification and a second heightened state of alert in response to a catalytic converter theft tamper event classification.

In contrast to the paragraph above, responsive to determining the acceleration-related data does not exceed the threshold, alert system 300 can perform operation 306(*b*) to discard the vehicle tamper event classification and maintain a default state of alert for alert system 300.

As alluded to above, the acceleration-related verification steps of operations 304 and 306(*a*)/(*b*) can reduce occurrence of false positive audio-based classifications caused by other noise events proximate to the vehicle that have similar audio signatures to vehicle tamper events (e.g., drilling or other noise from a construction site, rain, etc.). Reducing occurrence of false positive classifications has many advantages, including: (a) improving consumer trust in alert system 300; (b) reducing annoyance of false alarms; (c) saving power in implementations where an additional portion of alert system 300 is awakened/activated in response to verified detection/classification of a vehicle tamper event; etc.

Figure 4:
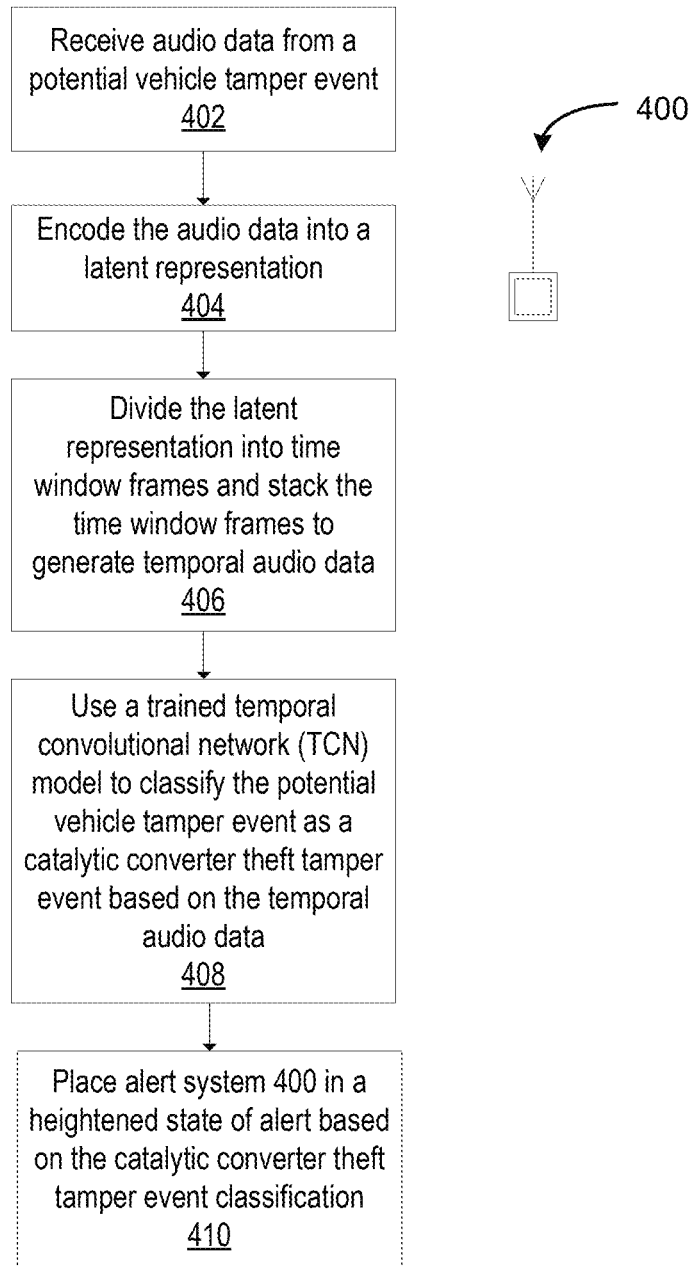
FIG. 4 depicts example operations for classifying vehicle tamper events based on audio data, in accordance with various examples of the presently disclosed technology.

FIG. 4 depicts example operations for classifying vehicle tamper events, in accordance with various examples of the presently disclosed technology. As depicted, the operations of FIG. 4 may be performed by an alert system 400 of the presently disclosed technology. Alert system 400 may be the same/similar as alert system 100 described in conjunction with FIG. 1.

As depicted, alert system 400 can perform operation 402 to receive audio data from a potential vehicle tamper event. The audio data can be raw or pre-processed data, and may be received from an audio sensor of alert system 400.

Alert system 400 can perform operation 404 to encode the audio data into a latent representation. The latent representation may comprise a lower-dimensional representation of the audio data that captures key/important features of audio data. Examples of latent representation for the audio data are described in greater detail in conjunction with FIG. 2.

Alert system 400 can perform operation 406 to divide the latent representation into time window frames and stack the time window frames to generate temporal audio data.

Based on the temporal audio data, alert system 400 can perform operation 408 to use a trained temporal convolutional network (TCN) model to classify the potential vehicle tamper event as a catalytic converter theft tamper event.

Alert system 400 can then perform operation 410 to place alert system 400 in a heightened state of alert based on the catalytic converter theft tamper event classification. As alluded to above, placing alert system 400 in the heightened state of alert may comprise at least one of: (a) activating an additional sensor of alert system 400 (e.g., a camera of alert system 400); (b) activating an audio alert; (c) activating a visual alert; and (c) sending an alert notification to a location remote from alert system 400 (e.g., sending an alert to a separate surveillance system, sending an alert to connected authorities, etc.).

In certain implementations, alert system 400 can perform a further operation to compare acceleration-related data from movement of a body of a vehicle (e.g., a vehicle being protected by alert system 400) during the potential vehicle tamper event to a threshold. In these implementations, placing alert system 400 in the heightened state of alert based on the catalytic converter theft tamper event classification may comprise, responsive to determining the acceleration-related data exceeds the threshold, placing alert system 400 in the heightened state of alert based on the catalytic converter theft tamper event classification.

As alluded to above, through use of temporal audio data and the TCN model, alert system 400 can improve classification accuracy over alternative approaches lacking this temporal approach. Such an improvement in classification accuracy has multiple advantages, including: (a) improving consumer trust; (b) reducing annoyance of false alarms; (c) saving power in implementations where an additional portion of alert system 400 is awakened/activated in response to verified detection/classification of a vehicle tamper event; (d) allowing for tailored responses to particular types of vehicle tamper events; etc.

Figure 5:
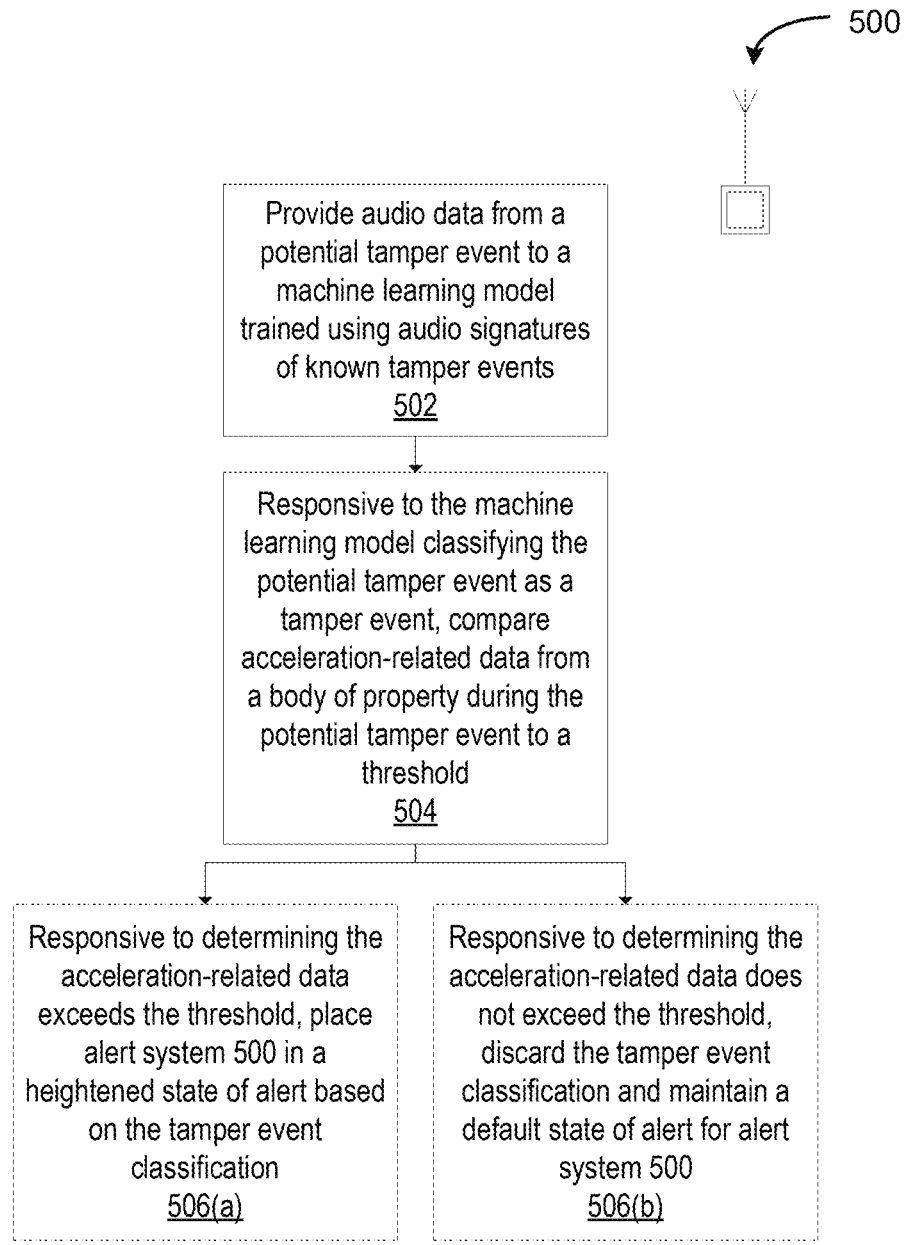
FIG. 5 depicts example operations for classifying tamper events involving property based on audio data, in accordance with various examples of the presently disclosed technology

FIG. 5 depicts example operations for classifying tamper events involving personal property based on audio data, in accordance with various examples of the presently disclosed technology. As depicted, the operations of FIG. 5 may be performed by an alert system 500 of the presently disclosed technology. Alert system 500 may be the same/similar as alert system 100 described in conjunction with FIG. 1.

As alluded to above, it should be understood that the principles disclosed herein can be applied to types of property other than vehicles. For example, certain types of personal property may be stored in enclosed spaces where line-of-sight to the personal property and/or a potential tampering event would be blocked or occluded. As depicted, alert system 500 can perform operations to protect such personal property (which may be, but need not be, a vehicle).

As depicted, alert system 500 can perform operation 502 to provide audio data from a potential tamper event to a machine learning model trained using audio signatures of known tamper events. The machine learning model can then classify the potential tamper event as a tamper event based on the audio data. The tamper event classification may comprise any number of tamper event classifications including: (a) a handle-pull or door-pull tamper event classification; (b) a drilling tamper event classification; (c) a key-lock tamper event classification; (d) a metal peeling-related tamper event classification (i.e., a tamper event classification related to tearing or peeling of metal bodywork); etc.

In some implementations, the machine learning model may classify the potential tamper event as a (non-tamper) event. These (non-tamper) event classifications can then be used to inform later classifications. For example, the machine learning model may classify the potential tamper event as a lock/unlock event. Here, classification of an lock/unlock event may indicate to alert system 500 that an immediately subsequent event is less likely to relate to a tamper event (this may be the case because an authorized individual is more likely to be involved with an lock/unlock event).

In certain implementations the audio data may comprise temporal audio data (e.g., audio data comprising stacked time window frames). Relatedly, the machine learning model may comprise a temporal convolutional network (TCN) model. In these examples, alert system 500 may perform further operations to: (a) receive first audio data from the potential tamper event; (b) encode the first audio data into a latent representation (i.e., a lower-dimension representation of the first audio data that captures important/key features of the first audio data); (c) divide the latent representation into time window frames and stack the time window frames to generate the temporal audio data; and (d) provide the temporal audio data to the TCN model. The first audio data can comprise raw audio data or pre-processed audio data, and may be received from an audio sensor of alert system 500. The audio sensor may be located within an interior space of the property being protected by alert system 500.

Responsive to the machine learning model classifying the potential tamper event as a tamper event (i.e., based on the audio data), alert system 500 can perform operation 504 to compare acceleration-related data from a body of property (e.g., property being protected by alert system 500) during the potential tamper event to a threshold. As alluded to above, the acceleration-related data may comprise at least one of relative acceleration data from the body of the property and relative jerk data from the body of the property. Correspondingly, the threshold may comprise at least one of an acceleration threshold and a jerk threshold. The acceleration-related data may comprise raw or pre-processed data, and may be received from an accelerometer of alert system 500 mounted to a surface of the body of the property.

Responsive to determining the acceleration-related data exceeds the threshold, alert system 500 can perform operation 506(*a*) to place alert system 500 in a heightened state of alert based on the tamper event classification. Placing alert system 500 in the heightened state of alert may comprise at least one of: (a) activating an additional sensor of alert system 500 (e.g., a camera of alert system 500); (b) activating an audio alert; (c) activating a visual alert; and (c) sending an alert notification to a location remote from alert system 500 (e.g., sending an alert to a separate surveillance system, sending an alert to connected authorities, etc.). As alluded to above, what constitutes placing alert system 500 may be different based on the tamper event classification. For example, alert system 500 may be placed in a first heightened state of alert in response to a handle-pull tamper event classification and a second heightened state of alert in response to a metal peeling-related tamper event classification.

In contrast to the paragraph above, responsive to determining the acceleration-related data does not exceed the threshold, alert system 500 can perform operation 506(*b*) to discard the tamper event classification and maintain a default state of alert for alert system 500.

As alluded to above, the acceleration-related verification steps of operations 504 and 506(*a*)/(*b*) can reduce occurrence of false positive audio-based classifications caused by other noise events proximate to the vehicle that have similar audio signatures to vehicle tamper events (e.g., drilling or other noise from a construction site, rain, etc.). Reducing occurrence of false positive classifications has many advantages, including: (a) improving consumer trust in alert system 500; (b) reducing annoyance of false alarms; (c) saving power in implementations where an additional portion of alert system 500 is awakened/activated in response to verified detection/classification of a vehicle tamper event; etc.

Figure 6:
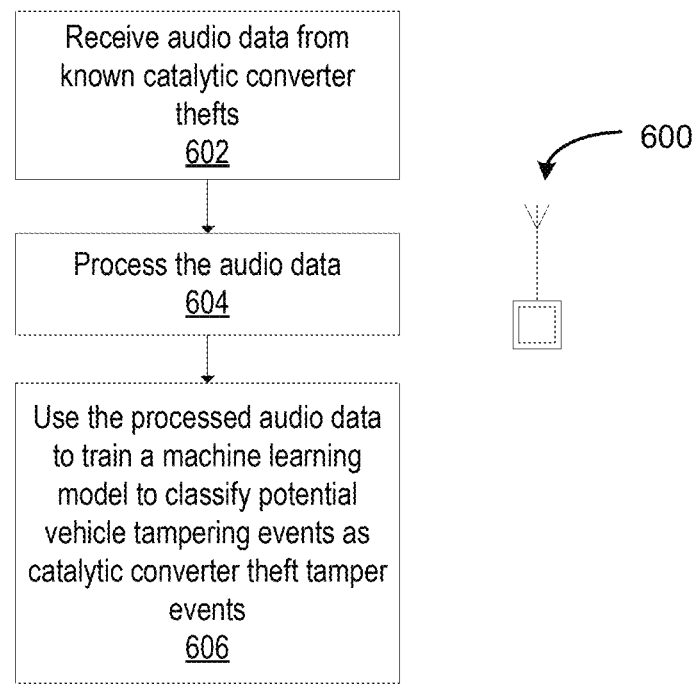
FIG. 6 depicts example operations for training a machine learning model to classify vehicle tamper events based on audio data, in accordance with various examples of the presently disclosed technology.

FIG. 6 depicts example operations for training a machine learning model to classify vehicle tamper events based on audio data, in accordance with various examples of the presently disclosed technology. As depicted, the operations of FIG. 6 may be performed by a training system 600 of the presently disclosed technology.

As depicted, training system 600 can perform operation 602 to receive audio data from known catalytic converter theft tamper events. The received audio data may comprise raw audio data and/or pre-processed audio data.

The known catalytic converter theft tamper events may comprise mock/simulated catalytic converter thefts performed on vehicles in a controlled setting. For example, audio may be recorded while a catalytic converter is cut away from the exhaust system of a vehicle during a mock/simulated catalytic converter theft. The known catalytic converter theft tamper events may also comprise actual catalytic converter thefts perpetrated "in-the-wild" (i.e., perpetrated catalytic converter theft tamper events) that are detected/classified by deployed alert systems of the presently disclosed technology.

In order to improve machine learning model training, training system 600 can perform operation 604 to process the audio data. Processing the audio data may comprise various types of processing, including any combination of: (a) sanitizing the audio data to remove extraneous noise or otherwise discarding noisy data, (b) labelling the audio data as relating to catalytic converter theft tamper events, (c) converting the audio data into latent representations, and (d) preparing temporal audio data by dividing latent representations of the audio data into time window frames and stacking the time window frames to generate the temporal audio data.

Accordingly, training system 600 can perform operation 606 to use the processed audio data to train a machine learning model (e.g., a TCN model) to classify potential vehicle tamper events as catalytic converter theft tamper events.

Training system 600 can also leverage audio data from known non-catalytic converter theft tamper events (e.g., a handle-pull tamper event, a drilling tamper event, a key-lock tamper event, a metal peeling-related tamper event, etc.) and known non-tamper events (e.g., construction site noise, rain, etc.) to train the machine learning model to classify different types of vehicle tamper events, and distinguish from non-tamper events. The audio data from the known non-catalytic converter theft tamper events and known non-tamper events may be collected during mock/simulated events in a lab setting (e.g., mock/simulated handle-pull tamper events, mock/simulated metal peeling-related tamper events, mock/simulated non-tamper events such as operation of a jack hammer on a road section proximate to a vehicle, etc.). Such audio data can be processed prior to use as training data in the same/similar manner as described in conjunction with operation 604.

Figure 7:
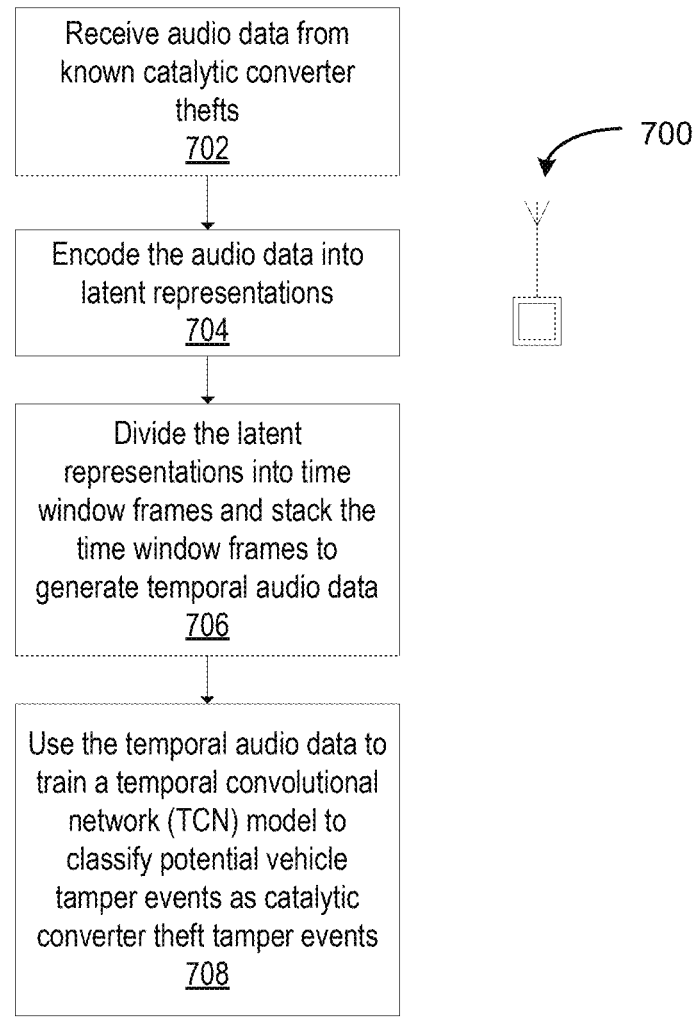
FIG. 7 depicts additional example operations for training a machine learning model to classify vehicle tamper events based on audio data, in accordance with various examples of the presently disclosed technology.

FIG. 7 depicts additional example operations for training a machine learning model to classify vehicle tamper events based on audio data, in accordance with various examples of the presently disclosed technology. As depicted, the operations of FIG. 7 may be performed by a training system 700 of the presently disclosed technology.

As depicted, training system 700 can perform operation 702 to receive audio data from known catalytic converter theft tamper events. The received audio data may comprise raw audio data and/or pre-processed audio data.

The known catalytic converter theft tamper events may comprise mock/simulated catalytic converter thefts performed on vehicles in a controlled setting. For example, audio may be recorded while a catalytic converter is cut away from the exhaust system of a vehicle during a mock/simulated catalytic converter theft. The known catalytic converter theft tamper events may also comprise actual catalytic converter thefts perpetrated "in-the-wild" that are detected/classified by deployed alert systems of the presently disclosed technology.

Training system 700 can perform operation 704 to encode the audio data into latent representations. As alluded to above, a latent representation for respective audio data from a respective known catalytic converter theft tamper event may comprise a lower-dimensional representation of the respective audio data that captures important/key features of the respective audio data. Examples of latent representations are described in greater detail in conjunction with FIG. 2.

Training system 700 can perform operation 706 to divide the latent representation into time window frames and stack the time window frames (for respective latent representations) to generate temporal audio data (for respective known catalytic converter theft tamper events).

Training system 700 can then perform operation 708 to use the temporal audio data to train a temporal convolutional network (TCN) model to classify potential vehicle tamper events as catalytic converter theft tamper events.

As alluded to above, training system 700 can also leverage audio data from known non-catalytic converter theft tamper events (e.g., a handle-pull tamper event, a drilling tamper event, a key-lock tamper event, a metal peeling-related tamper event, etc.) and known non-tamper events (e.g., construction site noise, rain, etc.) to train the TCN model to classify different types of vehicle tamper events, and distinguish from non-tamper events. The audio data from the known non-catalytic converter theft tamper events and known non-tamper events may be collected during mock/simulated events in a lab setting (e.g., mock/simulated handle-pull tamper events, mock/simulated metal peeling-related tamper events, mock/simulated non-tamper events such as operation of a jack hammer proximate to a vehicle, etc.). Such audio data can be processed prior to use as training data in the same/similar manner as described in conjunction with operation 704-706.

Figure 8:
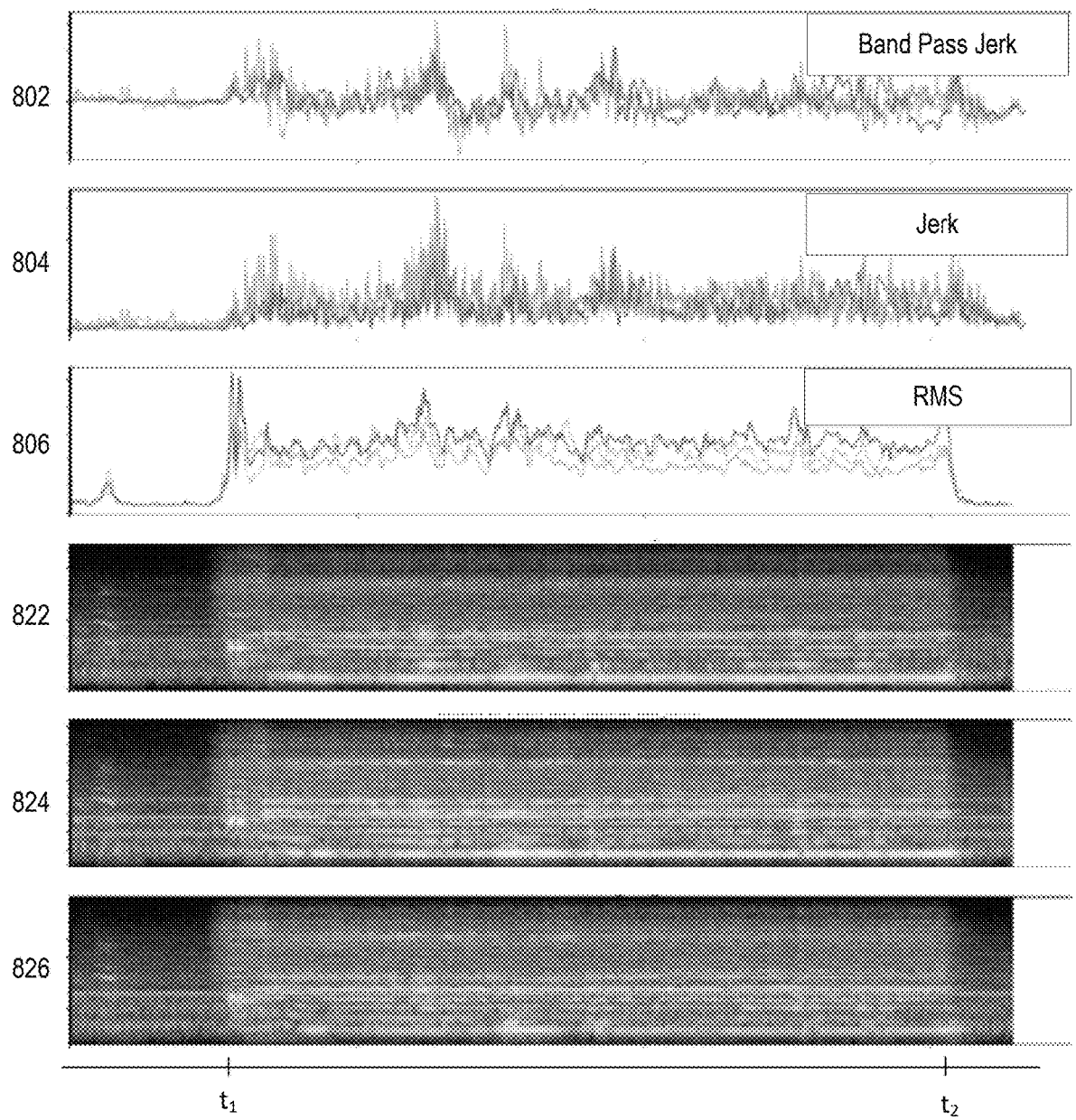
FIG. 8 depicts example acceleration-related data and audio data from a mock/simulated catalytic converter theft tamper event, in accordance with various examples of the presently disclosed technology.

FIG. 8 depicts example acceleration-related data and audio data from a mock/simulated catalytic converter theft tamper event, in accordance with various examples of the presently disclosed technology.

Namely, graphs 802-806 illustrate acceleration-related data from the mock/simulated catalytic converter theft tamper event. Graphs 822-826 illustrate audio data from the mock/simulated catalytic converter theft tamper event. As depicted, all six graphs use a common time scale along their respective "x" axes.

As alluded to above, the mock/simulated catalytic converter theft tamper event comprised an individual cutting away a catalytic converter from the underside of a vehicle. Three accelerometers, each mounted to a body of the vehicle, recorded acceleration-related data from the mock/simulated catalytic converter theft tamper event. Namely a first accelerometer mounted to a body within the front cabin space of the vehicle recorded acceleration-related data depicted in a first shade in graphs 802-806. A second accelerometer mounted to a body within the middle cabin space of the vehicle recorded acceleration-related data depicted in a second shade in graphs 802-806. A third accelerometer mounted to a body within the rear cabin space of the vehicle recorded acceleration-related data depicted in a third shade in graphs 802-806. Likewise, a first audio sensor (e.g., a first microphone) mounted within the front cabin space of the vehicle recorded the audio data depicted in graph 822. A second audio sensor (e.g., a second microphone) mounted within the middle cabin space of the vehicle recorded the audio data depicted in graph 824. A third audio sensor (e.g., a third microphone) mounted within the rear cabin space of the vehicle recorded the audio data depicted in graph 826.

As depicted, in graphs 802-826, the mock/simulated catalytic converter theft tamper event begin at approximately time $t_1$, and concluded at approximately time $t_2$. Prior to $t_1$ and after $t_2$ the accelerometers and audio sensors recorded ambient vibration/movement and ambient noise.

Graph 802 depicts a histogram of band-pass filtered jerk (i.e., a specification example of acceleration-related data) as a function of time during the mock/simulated catalytic converter theft tamper event. Here, the band-pass filtered jerk may be associated with all three of x, y, and z axes in space. As alluded to above, the three differently-shaded lines (better seen in graph 806) represent band-pass filtered jerk data obtained from the three differently-located accelerometers. In certain implementations, the band-pass filtered jerk data can be obtained directly from the accelerometers, whereas in other implementations the band-pass filtered jerk data may be a post-processed version of acceleration-related data obtained from the accelerometers.

Graph 804 depicts a histogram of jerk (i.e., a specification example of acceleration-related data) as a function of time during the mock/simulated catalytic converter theft tamper event. As alluded to above, the jerk data may be associated with all three of x, y, and z axes in space. Again, the three differently-shaded lines (better seen in graph 806) represent jerk data obtained from the three differently-located accelerometers. In certain implementations, the jerk data can be obtained directly from the accelerometers, whereas in other implementations the jerk data may be a post-processed version of acceleration-related data obtained from the accelerometers.

Graph 806 depicts a histogram of the root-mean-square (RSM) of jerk (i.e., a specification example of acceleration-related data) as a function of time during the mock/simulated catalytic converter theft tamper event. As alluded to above, the RMS jerk data may be associated with all three of an x, y, and z axes in space. Again, the three differently-shaded lines represent RMS jerk data obtained from the three differently-located accelerometers. In certain implementations, the RMS jerk data can be obtained directly from the accelerometers, whereas in other implementations the RMS jerk data may be a post-processed version of acceleration-related data obtained from the accelerometers.

Graphs 822-826 each depict spectrograms of audio data obtained from the mock/simulated catalytic converter theft tamper event. Namely, graph 822 depicts a spectrogram of audio data obtained from the first audio sensor, graph 824 depicts a spectrogram of audio data obtained from the second audio sensor, and graph 826 depicts a spectrogram of audio data obtained from the third audio sensor.

As depicted, the mock/simulated catalytic converter theft tamper event produced a unique temporal audio signature between times $t_1$ and $t_2$ which is visualized in the spectrograms of graphs 822-826. Relatedly, the mock/simulated catalytic converter theft tamper event produced a distinct acceleration-related signature during this time period. These signatures can be contrasted against the illustrated time before $t_1$ and after $t_2$.

As described throughout it this application, examples can detect/classify catalytic converter tamper events (and other vehicle tamper events) based on their associated unique audio signatures. Moreover, examples can verify these audio-based classifications by analyzing acceleration-related data (see e.g., graphs 802-806) to determine suspicious movement of a body of a vehicle during a potential/suspected vehicle tamper event.

It may also be noted from FIG. 8 that graphs 822-826 are substantially identical. This may indicate that in certain implementations, audio sensor placement may have a reduced impact on the audio data which is obtained/analyzed. In the specific example of the mock/simulated catalytic converter theft tamper event associated with FIG. 8, the vehicle was a van, and the three audio sensors were mounted within the cabin of the van. Here, similarity between graphs 822-826 may indicate that the body of the van effectively acted as an amplifier which improved audio sensing quality/consistency. Examples can leverage such an insight when making vehicle tamper event classifications based on audio data.

Figure 9:
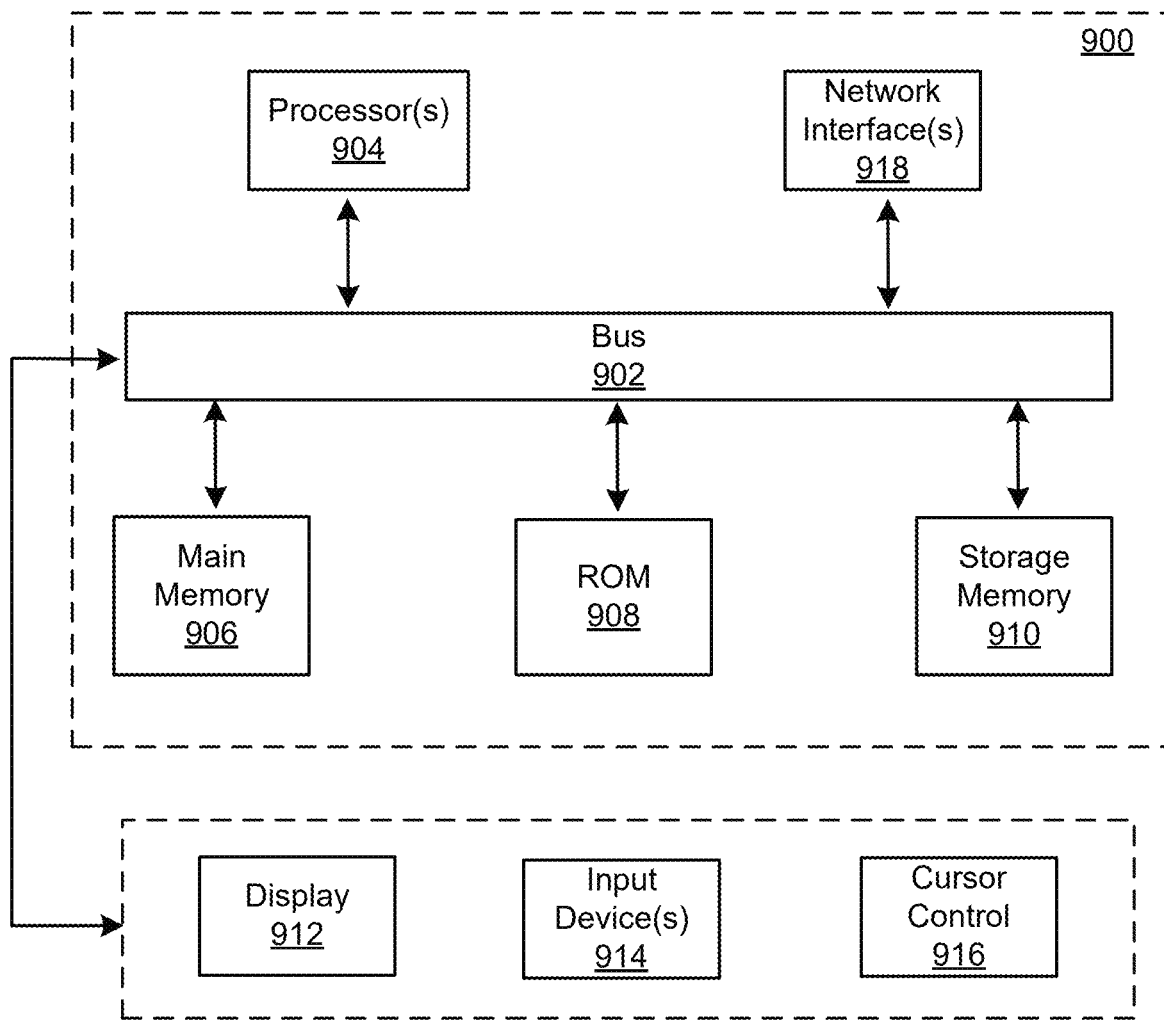
FIG. 9 depicts a block diagram of an example computer system in which various of the examples described herein may be implemented.

FIG. 9 depicts a block diagram of an example computer system 900 in which various of the examples described herein may be implemented. For example, computer system 900 may be used to implement alert system 100 of FIG. 1, alert system 200 of FIG. 2, alert system 300 of FIG. 3, alert system 400 of FIG. 4, alert system 500 of FIG. 5, training system 600 of FIG. 6, and training system 700 of FIG. 7. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some examples, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one example, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for protecting a vehicle, the method comprising:
   receiving audio data from a potential vehicle tamper event;
   encoding the audio data into a latent representation;
   dividing the latent representation into time window frames and stacking the time window frames to generate temporal audio data;
   based on the temporal audio data, using a trained temporal convolutional network (TCN) model to classify the potential vehicle tamper event as a catalytic converter theft tamper event; and
   placing an alert system in a heightened state of alert based on the catalytic converter theft tamper event classification.

2. The method of claim 1, further comprising:
comparing acceleration-related data from movement of a body of the vehicle during the potential vehicle tamper event to a threshold;
wherein, placing the alert system in the heightened state of alert based on the catalytic converter theft tamper event classification is responsive to determining the acceleration-related data exceeds the threshold.

3. The method of claim 2, further comprising:
responsive to determining the acceleration-related data does not exceed the threshold, discarding the catalytic converter theft tamper event classification and maintaining a default state of alert for the alert system.

4. The method of claim 1, wherein the latent representation of the audio data comprises a spectrogram of the audio data or features derived from a spectrogram of the audio data.

5. The method of claim 1, wherein placing the alert system in the heightened state of alert comprises at least one of:
activating an additional sensor of the alert system;
activating an audio alert;
activating a visual alert; and
sending an alert notification to a location remote from the alert system.

6. An alert system comprising:
one or more processing resources; and
memory, coupled to the one or more processing resources, the memory storing instructions executable by the one or more processing resources to:
receive audio data from a potential vehicle tamper event;
encode the audio data into a latent representation;
generate temporal audio data from the latent representation;
based on the temporal audio data, use a trained temporal convolutional network (TCN) model to classify the potential vehicle tamper event as a catalytic converter theft tamper event; and
place an alert system in a heightened state of alert based on the catalytic converter theft tamper event classification.

7. The alert system of claim 6, wherein generating temporal audio data from the latent representation comprises dividing the latent representation into time window frames and stacking the time window frames to generate the temporal audio data.

8. The alert system of claim 6, further comprising an audio sensor in communication with the one or more processing resources, wherein:
the audio sensor collects the audio data from the potential vehicle tamper event.

9. The alert system of claim 6, wherein:
the memory stores further instructions executable by the one or more processing resources to compare acceleration-related data from movement of a body of the vehicle during the potential vehicle tamper event to a threshold; and
placing the alert system in the heightened state of alert based on the catalytic converter theft tamper event classification is responsive to determining the acceleration-related data exceeds the threshold.

10. The alert system of claim 9, further comprising an accelerometer in communication with the one or more processing resources, wherein:
the accelerometer collects first acceleration-related data from the body of the vehicle during the potential vehicle tamper event; and
the acceleration-related data is derived from the first acceleration-related data.

11. The alert system of claim 9, wherein the memory stores further instructions executable by the one or more processing resources to:
responsive to determining the acceleration-related data does not exceed the threshold, discard the catalytic converter theft tamper event classification and maintain a default state of alert for the alert system.

12. The alert system of claim 6, wherein placing the alert system in the heightened state of alert comprises at least one of:
activating an additional sensor of the alert system;
activating an audio alert;
activating a visual alert; and
sending an alert notification to a location remote from the alert system.

13. Non-transitory computer-readable medium storing instructions, which when executed by one or more processors, cause the one or more processors to:
receive audio data from known catalytic converter theft tamper events; generate temporal audio data from the audio data by encoding the audio data into a latent representation and dividing the latent representation into time window frames and stacking the time window frames to generate the temporal audio data; and
use the temporal audio data to train a temporal convolutional network (TCN) model to classify potential vehicle tamper events as catalytic converter theft tamper events, wherein the known catalytic converter theft tamper events comprise at least one of mock catalytic converter theft tamper events performed in a controlled environment; and perpetrated catalytic converter theft tamper events detected by deployed alert systems.

* * * * *